(12) United States Patent
Yang

(10) Patent No.: US 11,137,608 B2
(45) Date of Patent: Oct. 5, 2021

(54) SLIM IMMERSIVE DISPLAY DEVICE, SLIM VISUALIZATION DEVICE, AND USER EYE-TRACKING DEVICE

(71) Applicant: ELECTRONICS AND TELECOMMUNICATIONS RESEARCH INSTITUTE, Daejeon (KR)

(72) Inventor: Ung-Yeon Yang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/933,236

(22) Filed: Jul. 20, 2020

(65) Prior Publication Data

US 2021/0088789 A1 Mar. 25, 2021

(30) Foreign Application Priority Data

Sep. 25, 2019 (KR) .......................... 10-2019-0118021
Jun. 9, 2020 (KR) .......................... 10-2020-0069687

(51) Int. Cl.
*G09G 5/00* (2006.01)
*G02B 27/01* (2006.01)
(Continued)

(52) U.S. Cl.
CPC ....... *G02B 27/0172* (2013.01); *G02B 3/0056* (2013.01); *G02B 3/08* (2013.01); *G02B 27/0093* (2013.01); *G02B 27/0179* (2013.01); *G02B 27/0103* (2013.01); *G02B 2027/013* (2013.01); *G02B 2027/0174* (2013.01); *G02B 2027/0187* (2013.01)

(58) Field of Classification Search
CPC .... G02B 27/0172; G02B 3/0056; G02B 3/08; G02B 27/0093
USPC .......................................................... 345/7
See application file for complete search history.

(56) References Cited

U.S. PATENT DOCUMENTS 10,198,865 B2 2/2019 Kezele et al.
10,613,328 B2 4/2020 Hua et al.
(Continued)

FOREIGN PATENT DOCUMENTS

JP 2016-018213 A 2/2016
KR 10-0949743 B1 3/2010
(Continued)

*Primary Examiner* — Jonathan M Blancha
(74) *Attorney, Agent, or Firm* — LRK Patent Law Firm

(57) ABSTRACT

A slim immersive display device, a slim visualization device, and a user eye-tracking device. The slim immersive display device includes a display panel, a super-proximity visualization optical unit formed of a pinhole array film or a micro-lens array and configured to form an image output via the display panel on a retina of an eyeball of a user located a very short distance from the super-proximity visualization optical unit, an environment information control unit configured to determine an image to be output in accordance with virtual reality environment information, and an image generation unit configured to generate the output image determined by the environment information control unit in a form of super-proximity unit images and output the super-proximity unit images to the display panel.

18 Claims, 15 Drawing Sheets

(51) Int. Cl.
    *G02B 3/00*        (2006.01)
    *G02B 3/08*        (2006.01)
    *G02B 27/00*     (2006.01)

(56) References Cited

U.S. PATENT DOCUMENTS

| | | |
|---|---|---|
| 10,747,314 B1 * | 8/2020 | Chang ................... G06T 5/002 |
| 2011/0310238 A1 | 12/2011 | Koh et al. |
| 2015/0205126 A1 * | 7/2015 | Schowengerdt ......... H04N 5/21 |
| | | 345/633 |
| 2016/0363763 A1 | 12/2016 | Yang et al. |
| 2017/0038591 A1 * | 2/2017 | Jepsen ................. G02B 5/1842 |
| 2017/0115491 A1 * | 4/2017 | Shi ..................... G02B 27/0176 |
| 2017/0185037 A1 * | 6/2017 | Lee ....................... G03H 1/2286 |
| 2017/0188823 A1 * | 7/2017 | Ganesan ............ G02B 27/0093 |
| 2017/0235219 A1 * | 8/2017 | Kostamo .......... B29D 11/00951 |
| | | 264/40.1 |
| 2018/0150690 A1 | 5/2018 | Yin |
| 2019/0068958 A1 * | 2/2019 | Kim ..................... H04N 13/322 |
| 2019/0243131 A1 | 8/2019 | Yi et al. |
| 2019/0258062 A1 * | 8/2019 | Aleem .................. G02B 26/12 |

FOREIGN PATENT DOCUMENTS

| | | |
|---|---|---|
| KR | 10-2018-0133937 A | 12/2018 |
| KR | 10-2019-0089912 A | 7/2019 |
| KR | 10-2019-0094270 A | 8/2019 |

\* cited by examiner

SLIM IMMERSIVE DISPLAY DEVICE, SLIM VISUALIZATION DEVICE, AND USER EYE-TRACKING DEVICE

CROSS REFERENCE TO RELATED APPLICATIONS

This application claims the benefit of Korean Patent Application Nos. 10-2019-0118021, filed Sep. 25, 2019 and 10-2020-0069687, filed Jun. 9, 2020, which are hereby incorporated by reference in their entireties into this application.

BACKGROUND OF THE INVENTION

1. Technical Field

Embodiments relate to user interface technology used in the fields of Virtual Reality (VR), Augmented Reality (AR), and Mixed Reality (MR).

2. Description of Related Art

As a representative user interface that is used to realistically represent a user's personal experience based on a freely settable viewpoint, for example, six degrees of freedom (6DOF) in the fields of Virtual Reality (VR), Augmented Reality (AR) and Mixed Reality (MR), there is a Head-Mounted Display (HMD), which is an immersive display.

However, the quality of a current HMD is not sufficient to implement presence at the same level as the user's visual experience in the user's actual environment. Due thereto, when the user undergoes virtual training when wearing the HMD, he or she definitely perceives the difference between the real environment and the virtual environment, thus making it difficult to realize the user's desired training effect in a manner identical to that in the real environment due to the deterioration of virtual presence.

As a representative cognitive factor resulting in the deterioration of presence in the virtual space, the problem of a mismatch in a field of view is present. That is, since the optical system of an existing fully immersive display (HMD) is fixed for a specific type of eyesight condition, there is a limitation in that a user who has other eyesight characteristics must wear a separate accessory for eyesight correction.

Further, since the current HMD is implemented to have a head-worn part having a considerable volume and weight so as to improve a sense of visual immersion, the user has an unfamiliar experience in a virtual training situation due to the volume and weight of the HMD, which is not experienced in an actual environment.

When a virtual training system is developed, sensation-matching technology that generates the same stimulus as that in the actual field to enable the construction of a training environment in a virtual space without interfering with the user's experience via a user interface in the actual field is required in order to accept the basic design principle of the training system indicating that "the capability acquired in the training process must be able to be equally utilized in a field without feeling unfamiliarity or discomfort". However, as described above, existing user display interfaces are limited in that not all physical phenomena occurring between the environment, realized by human visual sensory organs, and sense perception organs can be reproduced.

SUMMARY OF THE INVENTION

An embodiment is configured to prevent a display device from interfering with the experience of a user in the field by reducing the volume and weight of the display device and by enhancing a wearing sensation, thus improving a visual sense of immersion.

Further, an embodiment is configured to overcome the limitation of an existing fully immersive display (HMD) in that the optical system thereof is fixed for a specific type of eyesight and then a separate eyesight correction accessory must be used for users having eyesight characteristics other than the specific type of eyesight.

In accordance with an aspect, there is provided a slim immersive display device, including a display panel, a super-proximity visualization optical unit formed of a pinhole array film or a micro-lens array and configured to form an image output via the display panel on a retina of an eyeball of a user located a very short distance from the super-proximity visualization optical unit, an environment information control unit configured to determine an image to be output in accordance with virtual reality environment information, and an image generation unit configured to generate the output image determined by the environment information control unit in a form of super-proximity unit images and output the super-proximity unit images to the display panel.

The slim immersive display device may further include an eye sensor unit configured to sense movement of a pupil of the eyeball of the user, and an eye-tracking unit configured to track the user's eye based on information about the sensed movement of the pupil, wherein the image generation unit generates super-proximity multi-view unit images based on the tracked user's eye.

The display panel, the super-proximity visualization optical unit, and the eye sensor unit may be implemented as an integrated slim visualization module, and the slim visualization module may be divided to correspond to a left eye and a right eye.

The slim immersive display device may further include a refractive lens configured to refract visible light that is traveling straight in accordance with the image output via the display panel in a direction of a center of the eyeball of the user.

The refractive lens may be a Fresnel lens or a micro-lens array.

The refractive lens may be interposed between the display panel and the super-proximity visualization optical unit, and the super-proximity visualization optical unit may be a pinhole mask in which multiple pinholes are formed at irregular intervals so that the pinholes correspond to a path of visible light refracted by the refractive lens.

The refractive lens may be configured such that a first surface thereof is disposed on a second surface of the super-proximity visualization optical unit facing the display panel, and the super-proximity visualization optical unit may be a pinhole mask in which multiple pinholes are formed at regular intervals so that the pinholes correspond to a path of visible light that is traveling straight from the display panel.

The slim immersive display device may further include a holographic optical element configured to refract visible light that is traveling straight in accordance with the image output via the display panel in a direction of a center of the eyeball of the user.

The slim visualization module may have a shape of a curved surface.

The eye sensor unit may include at least one infrared light source configured to project infrared light onto the eyeball of the user, and an infrared light reception unit configured to receive infrared light reflected from the eyeball of the user, and the eye-tracking unit may track movement of a pupil depending on a distribution pattern of an amount of energy of infrared light received by the infrared light reception unit.

The infrared light source may be configured such that multiple infrared light sources are disposed in a region in the pinhole mask which pinholes are not formed.

The eye-tracking unit may be implemented as a neural network that is previously trained with distribution patterns of amounts of energy of infrared light reflected from the pupil of the eyeball of the user and from a remaining part other than the pupil.

The image generation unit may generate super-proximity unit images so that proportions of overlaps between two or more super-proximity unit images formed on a retina of the eyeball of the user are minimized while minimizing a distance from the display panel to a lens of the eye of the user.

In accordance with another aspect, there is provided a slim visualization device, including a display panel configured to output an image signal that is externally input, and a super-proximity visualization optical unit formed of a pinhole array film or a micro-lens array and configured to form an image output via the display panel on a retina of an eyeball of a user located a very short distance from the super-proximity visualization optical unit.

The slim visualization device may further include a refraction unit configured to refract visible light that is traveling straight in accordance with the image output via the display panel in a direction of a center of the eyeball of the user, wherein the refraction unit is one of a Fresnel lens, a micro-lens array, and a holographic optical element.

The refraction unit may be interposed between the display panel and the super-proximity visualization optical unit, and the super-proximity visualization optical unit may be a pinhole mask in which multiple pinholes are formed at irregular intervals so that the pinholes correspond to a path of visible light refracted by the refraction unit.

The refraction unit may be configured such that a first surface thereof is disposed on a second surface of the super-proximity visualization optical unit facing the display panel, and the super-proximity visualization optical unit may be a pinhole mask in which multiple pinholes are formed at regular intervals so that the pinholes correspond to a path of visible light that is traveling straight from the display panel.

The slim visualization device may further include at least one infrared light source configured to project infrared light onto the eyeball of the user, and an infrared light reception unit configured to receive infrared light reflected from the eyeball of the user, and then acquire energy information of the infrared light.

The infrared light source may be configured such that multiple infrared light sources are disposed in a region in the pinhole mask which pinholes are not formed.

In accordance with a further aspect, there is provided a user eye-tracking device, including an infrared light source configured to project infrared light onto an eyeball of a user, an infrared light reception unit configured to receive infrared light reflected from the eyeball of the user, and an eye-tracking unit configured to track movement of a pupil depending on a distribution pattern of an amount of energy of infrared light received by the infrared light reception unit, wherein the eye-tracking unit is implemented as a neural network that is previously trained with distribution patterns of amounts of energy of infrared light reflected from the pupil of the eyeball of the user and from a remaining part other than the pupil.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
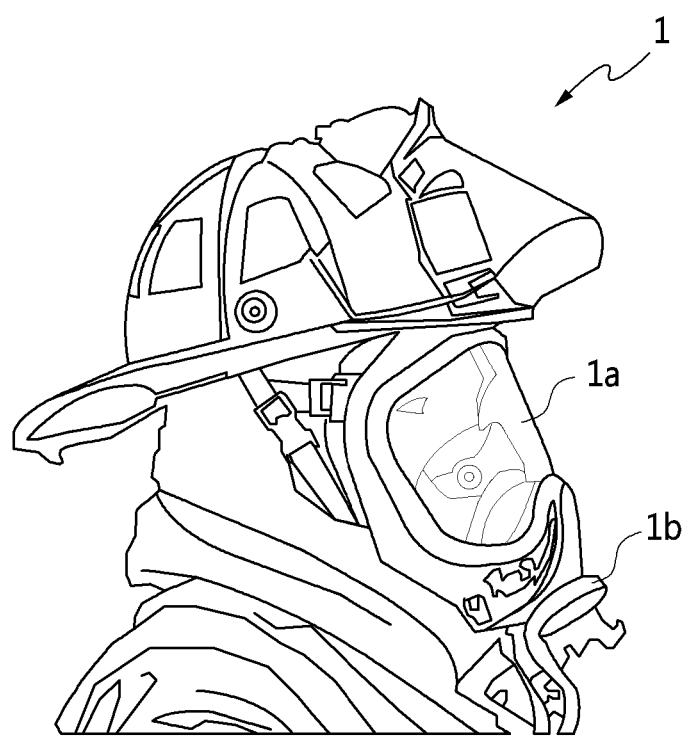
FIG. 1 is a view illustrating an example in which a positive-pressure respirator is worn.

Advantages and features of the present invention and methods for achieving the same will be clarified with reference to embodiments described later in detail together with the accompanying drawings. However, the present invention are implemented in various forms without being limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may also be a second component without departing from the technical spirit of the present invention.

The terms used in the present specification are merely used to describe specific embodiments and are not intended to limit the present invention. A singular expression includes a plural expression unless a description to the contrary is specifically made in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Hereinafter, a slim immersive display device, a slim visualization device, and an eye-tracking device according to embodiments will be described in detail with reference to the attached drawings.

An embodiment relates to a slim immersive display device which subjects a user to the same experience in the field (scene), and the slim immersive display device according to the embodiment may be applied to a Head-Mounted Display (HMD) for virtual reality firefighting practice in which a firefighter is subjected to individual experience and collaborative training in a virtual space. However, this is only an example for helping better understanding of the present invention, and the present invention is not limited thereto. That is, the slim immersive display device according to the embodiment may be utilized not only for virtual reality firefighting practice, but also for various types of content to which Virtual-Reality (VR), Augmented-Reality (AR), and Mixed-Reality (MR) fields are applied.

An HMD is mainly used as a virtual reality interface in conventional virtual reality firefighting practice, in which a learner must wear both the HMD and a respirator.

FIG. 1 is a view illustrating an example in which a positive-pressure respirator is worn.

Referring to FIG. 1, a positive-pressure respirator 1 is equipment which prevents the inflow of external harmful gas due to the higher pressure inside of the facepiece than outside of the facepiece, and protects firefighters because the on/off operation of the respirator valve is controlled such that uniform air pressure is maintained depending on the breathing capacity of the user.

In the positive-pressure respirator 1, a transparent visor 1a, which covers the entire facial region, and a respirator 1b, are manufactured to be integrated with each other. However, the volume of an HMD is too large to wear the HMD inside the transparent visor 1a of the positive-pressure respirator 1, and it is also impossible to wear the HMD outside of the positive-pressure respirator 1.

Therefore, in virtual reality firefighting practice, because the HMD is worn, a negative-pressure respirator, which is provided for a rescued user, rather than the positive-pressure respirator 1, which is actually used by firefighters, is used.

Figure 2:
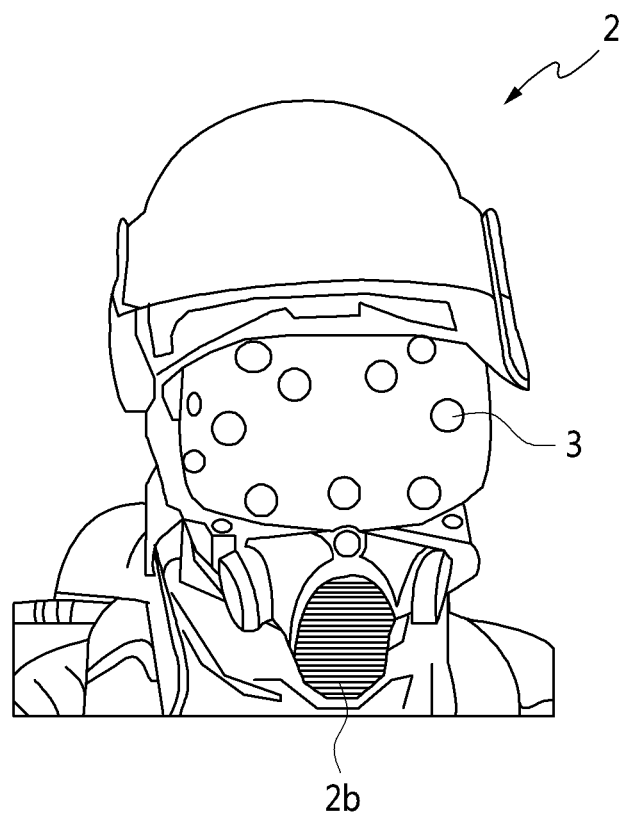
FIG. 2 is a view illustrating an example in which a Head-Mounted Display (HMD) for virtual-reality training and a negative-pressure respirator are worn.

FIG. 2 is a view illustrating an example in which an HMD for virtual-reality training and a negative-pressure respirator are worn.

Referring to FIG. 2, since a facial part is open in a negative-pressure respirator 2, an HMD 3 may be worn. The negative-pressure respirator 2 is operated according to a scheme in which a respirator 2b is opened when a user inhales air, and does not prevent the possibility of external poisonous gas permeating into the respirator 2b.

Therefore, when the same virtual reality firefighting practice is undergone using such a negative-pressure respirator 2, a firefighter cannot experience the same breathing sense as in an actual field situation. That is, there is an increase in the sense of difference with respect to the case where the positive-pressure respirator 1 which is utilized in the actual firefighting field is used.

That is, virtual reality firefighting practice using the negative-pressure respirator 2 may be suitable for amateurs other than firefighters by providing a demonstration as if the negative-pressure respirator 2 were used in cooperation with field equipment, but the virtual reality fire-fighting practice using the negative-pressure respirator 2 may be unsuitable for firefighters who must learn the capability to respond in the field through training.

Therefore, embodiments are intended to propose a slim immersive display device so that the same positive-pressure respirator as that actually used in the field of accidents can be used when various types of disaster/safety-related situations are implemented for training systems in a virtual environment.

Figure 3:
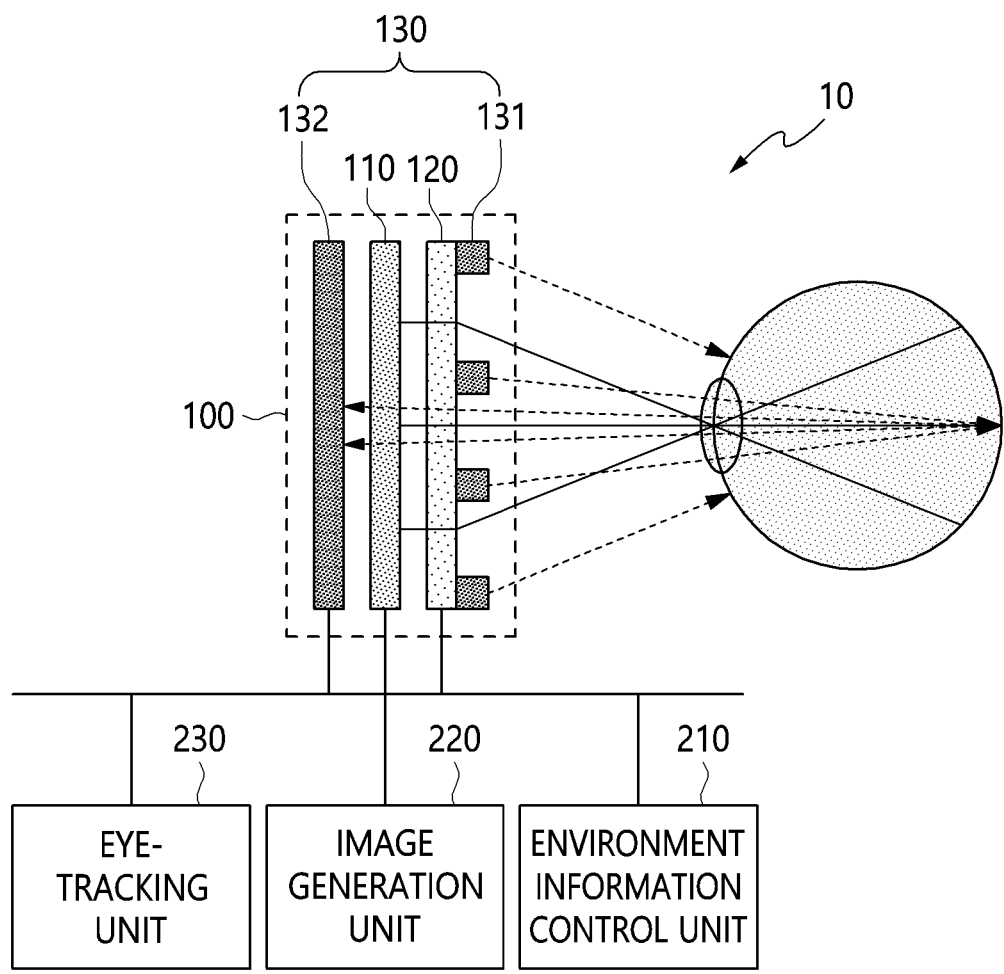
FIG. 3 is a schematic block diagram illustrating a slim immersive display device according to an embodiment.
Figure 4:
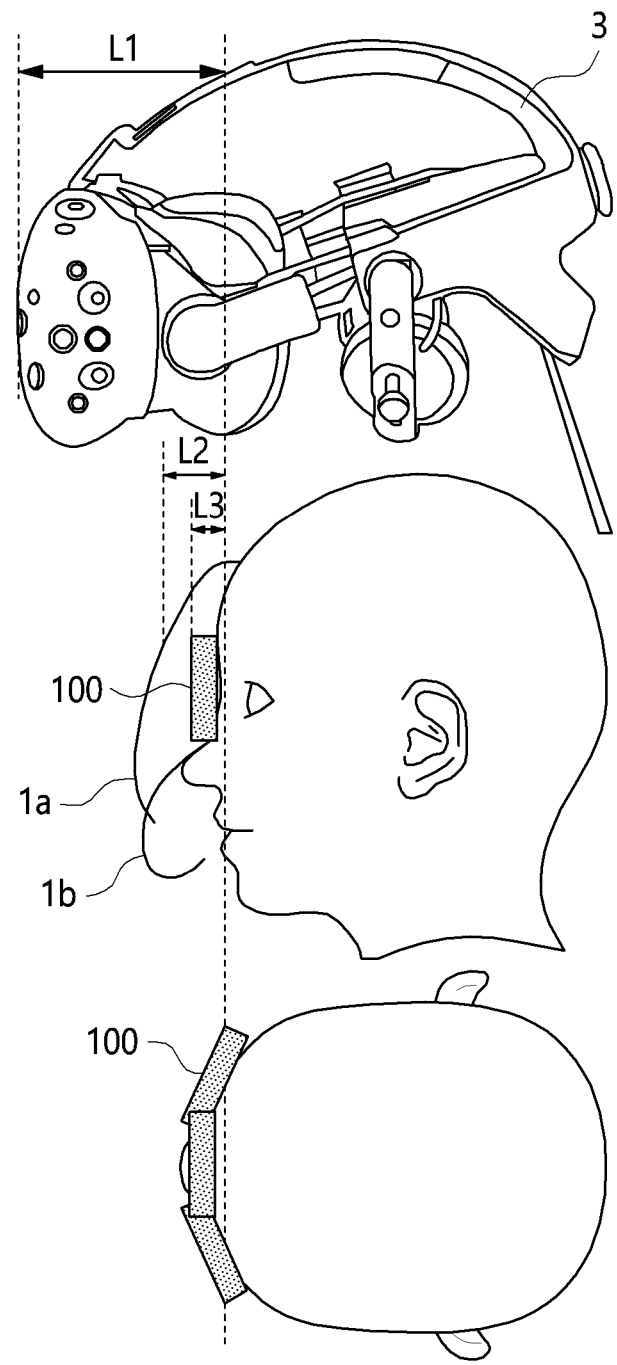
FIG. 4 illustrates a side view and top view of the state in which a slim immersive display device according to an embodiment is worn.
Figure 5:
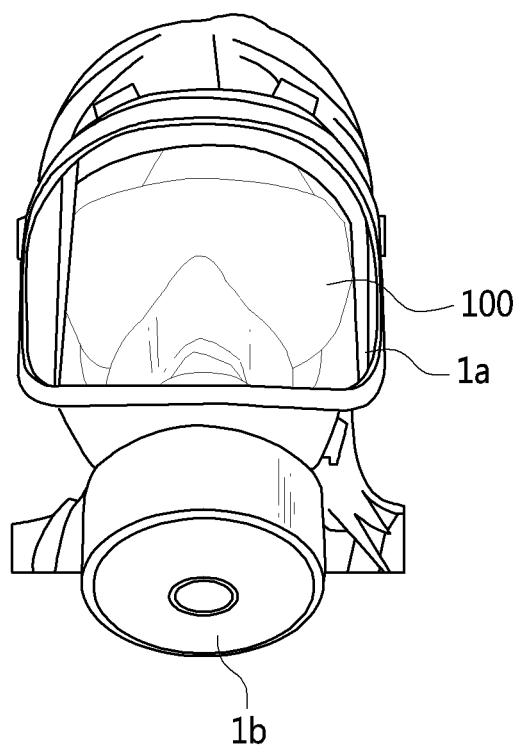
FIG. 5 is a front view illustrating an example in which a slim immersive display device according to an embodiment is worn.

FIG. 3 is a schematic block diagram illustrating a slim immersive display device according to an embodiment, FIG. 4 illustrates a side view and top view of the state in which a slim immersive display device according to an embodiment is worn, and FIG. 5 is a front view illustrating an example in which a slim immersive display device according to an embodiment is worn.

Referring to FIG. 3, a slim immersive display device 10 according to an embodiment may include a display panel 110, a super-proximity visualization optical unit 120, an environment information control unit 210, and an image generation unit 220.

Here, the display panel 110 and the super-proximity visualization optical unit 120 may be implemented as an integrated slim visualization module (device) 100.

Further, although not illustrated in the drawings, the slim visualization module 100 is configured such that the display panel 110 and the super-proximity visualization optical unit 120 are mounted in a main body and a band part or a locking part is coupled to both ends of the main body, thus enabling the slim visualization module 100 to be fixed to the head circumference or ears of a user in the state in which the main body covers the eyes of the user.

The display panel 110, which is a means for outputting (displaying) an image generated by the image generation unit 220, may be provided as any one of a Liquid Crystal Display (LCD), Liquid Crystal on Silicon (LCoS), Digital Light Processing (DLP), and an Organic Light-Emitting Diode (OLED) display.

However, when the display panel 110 approaches the eyeball of the user within a distance of about 10 cm or less, a person having normal eyesight cannot clearly see the image output via the display panel 110 due to the restriction of focusing ability in a near-vision range of the eye lens of the user. Therefore, technology that additionally provides an optical unit between the display panel and the user's eyeball and realizes an image on the display panel physically located at a short distance to the user's eyeball as a virtual image spaced apart from the eyeball by a predetermined distance (e.g., 2 to 3 m) has been applied to a commercial HMD (e.g., Oculus Rift or HTC Vive). However, the thickness of the optical unit that is used has a thickness of about 10 cm.

Therefore, as illustrated in FIG. 4, the commercial HMD 3 is manufactured to have a relatively large thickness L1 from the facial line of the user around the eye, and thus the thickness L1 is much greater than the allowable space thickness L2 of the transparent visor 1a of the positive-pressure respirator.

Therefore, the slim visualization module 100 according to the embodiment is manufactured such that the thickness L3 thereof is less than the allowable space thickness L2, for example, such that the shape of the slim visualization module 100 is as slim as an eye patch coming into close contact with the eyes of the user, as illustrated in FIG. 5, thus allowing the user to wear the slim visualization module 100 inside the transparent visor 1a of the positive-pressure respirator 1.

Referring back to FIG. 3, the super-proximity visualization optical unit 120 according to the embodiment is disposed at a very short distance from the display panel 110 while being spaced apart from the display panel 110, and is configured to form the image output via the display panel 110 on the retina of the eyeball of the user located at a very short range from the super-proximity visualization optical unit 120.

Here, the super-proximity visualization optical unit 120 may be a pinhole mask manufactured to be slim using a Pinhole Array Film (FAP).

That is, the super-proximity visualization optical unit 120 may be implemented in a light-field display structure based on the principle of a pinhole camera model corresponding to a pinhole camera so as to reduce the distance to the eyeball of the user to a very short distance.

Figure 6:
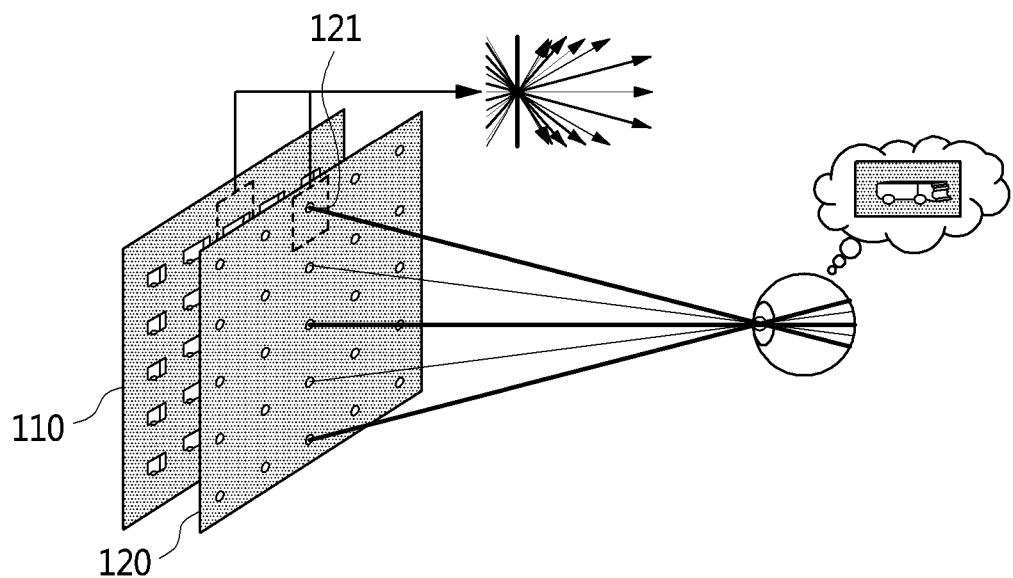
FIG. 6 is a view illustrating an example of a light-field display based on a pinhole camera model.

FIG. 6 is a view illustrating an example of a light-field display based on a pinhole camera model.

Referring to FIG. 6, since individual pinholes 121 formed in a pinhole array film 120 enable an original image (source) to be clearly formed as an image on the retina (target) of the eyeball depending on the principle of the pinhole camera, the pinhole array film 120 is robust to the influence of change in a focal length caused by the lens of the eyeball, thus enabling a display that is capable of representing a large depth of focus to be implemented. That is, the pinhole camera model is advantageous in that, if an observation target, that is, an image output (displayed) via the display panel 110, is present at an arbitrary location unrestricted by the distance to the pinhole, a clear image may always be formed on the retina. Therefore, as in the case of the embodiment, even if the slim visualization module 100 comes into close contact with the eyes, the user may view a clear image.

Meanwhile, the function of the super-proximity visualization optical unit 120 may be replaced and implemented with optical part generation technology based on a Micro-Lens Array (MLA), having a diameter of several μm to several mm or less.

Meanwhile, the slim visualization module 100 may be a binocular module divided to correspond to a left eye and a right eye.

Figure 7:
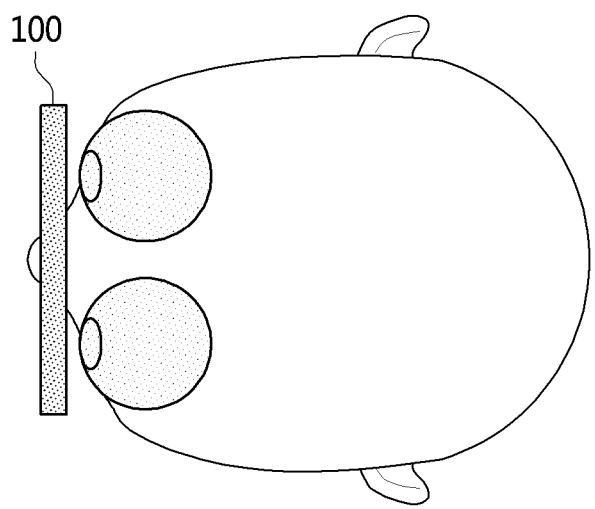
FIG. 7 is a view illustrating an example in which an integrated visualization module is worn.
Figure 8:
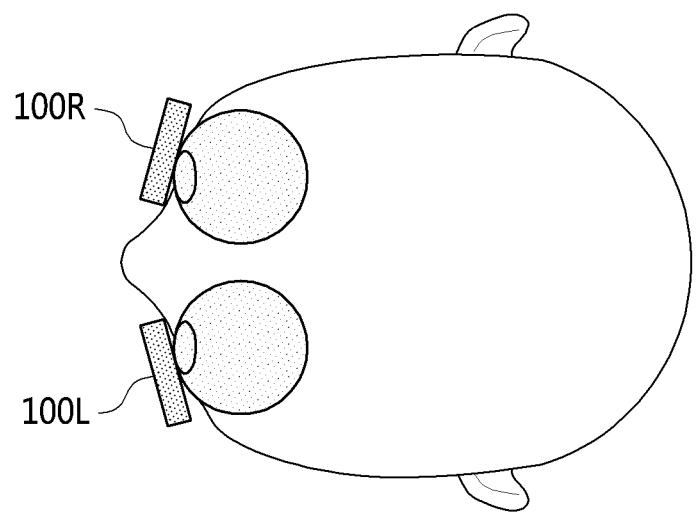
FIG. 8 is a view illustrating an example in which a binocular slim visualization module according to an embodiment is worn.

FIG. 7 is a view illustrating an example in which an integrated visualization module is worn, and FIG. 8 is a view illustrating an example in which a binocular slim visualization module according to an embodiment is worn.

As illustrated in FIG. 7, when the slim visualization module 100 is configured in a single-plane integration form, it is not only impossible to accommodate the curvature of a face, but it is also difficult to mount the slim visualization module 100 inside a surface-type respirator in which a curved surface is formed.

Therefore, as illustrated in FIG. 8, the slim visualization module 100 may be divided into a left-eye slim visualization module 100L and a right-eye slim visualization module 100R. By means of this structure, the center of the display panel 110 may match the location which is the center of the rotation ranges of the left and right eyeballs, thus improving image quality. Furthermore, since the distances between the slim visualization modules 100L and 100R and eyes may be as short as possible, the sizes of the slim visualization modules 100L and 100R may be relatively small while a wide viewing angle may be supported.

Meanwhile the slim visualization module 100 according to the embodiment may include a refraction unit for refracting visible light corresponding to an image output via the display panel 110 in the direction of the center at a uniform curvature. Here, the refraction unit may be manufactured as an optical refractive lens or a Holographic Optical element (HOE).

The reason for this is that, when the slim visualization module 100 is manufactured in a planar shape, degradation and distortion of an image are prevented from occurring when light transmission distances to the center and to an edge in an optical path are different from each other in the case where the target is observed from a very short distance. For example, this may also be the reason why a large TV is implemented to be curved.

Therefore, in accordance with an embodiment, the image output via the display panel 110 is refracted in the direction of the center at a uniform curvature, so that, depending on the movement of the eyes, that is, the movement of the eyeballs, the distances of the optical paths of light transferred from the display panel 110 to the retinas of the eyes become equal to each other, and thus the user may experience images of an equal quality from observation viewpoints in all directions.

Various embodiments of the slim visualization module 100 including the refractive lens or HOE will be described later with reference to FIGS. 10 to 15.

Referring back to FIG. 3, the environment information control unit 210 may recognize the user's environment or the like, and may determine an image to be output in accordance with the situation of the virtual reality based on the results of the recognition.

The image generation unit 220 may generate the output image determined by the environment information control unit 210 in the form of super-proximity unit images, and may output the super-proximity unit images to the display panel 110.

Here, the image generation unit 220 may generate super-proximity unit images so that proportions of overlaps between two or more super-proximity unit images formed on the retina of the eyeball of the user are minimized. That is, the image generation unit 220 generates super-proximity unit images corresponding to the optical properties of the super-proximity visualization optical unit 120. This operation will be described in detail later with reference to FIGS. 21 to 24.

Meanwhile, referring back to FIG. 3, the slim immersive display device 10 according to the embodiment may further include an eye sensor unit 130 and an eye-tracking unit 230.

The eye sensor unit 130 may sense the movement of the pupil of the user's eyeball.

Here, the eye sensor unit 130 may include infrared light sources 131, which project infrared light onto the user's eyeball, and an infrared light reception unit 132, which receives infrared light reflected from the user's eyeball.

Here, the infrared light sources 131 may be micro-infrared light source elements (IR sources) having a size of several mm or less.

Further, multiple infrared light sources 131 may be arranged to be spaced apart from each other in a region in the pinhole mask in which pinholes are not formed.

Figure 9:
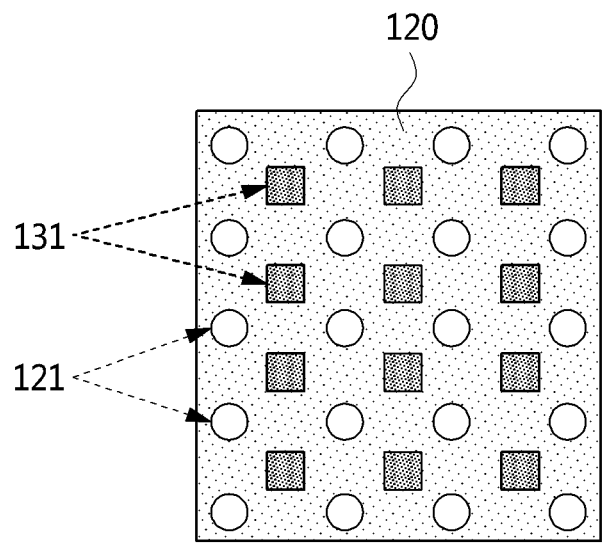
FIG. 9 is a view illustrating an example of the arrangement of infrared light sources according to an embodiment.

FIG. 9 is a view illustrating an example of the arrangement of infrared light sources according to an embodiment.

Referring to FIG. 9, infrared light sources 131 are arranged in a region for blocking light between pinholes 121 in a pinhole mask 120, thus preventing the optical path of light passing through the pinholes from being blocked.

Meanwhile, the infrared light reception unit 132 may receive transferred reflected light when the infrared light, projected from the infrared light sources 131, is reflected from the user's eyes and is then transferred while passing through the pinholes 121 and the image display panel 110. The infrared light reception unit 132 may be, for example, a Micro Photodiode (MPD).

Meanwhile, the eye-tracking unit 230 may track the movement of the pupil depending on the distribution pattern of the amount of energy of infrared light received by the infrared light reception unit 132.

Here, the eye-tracking unit 230 may be implemented as a neural network that is previously trained based on the distribution patterns of the amounts of energy of infrared light reflected from the pupil of the user's eyeball and from the remaining part other than the pupil.

That is, typical eye-tracking technology is implemented as an algorithm that captures an image reflected from a pupil and thereafter searches for a three-dimensional (3D) vector of the pupil through an image-processing procedure. However, in the embodiment, the eye-tracking technology is implemented using eye-tracking based on machine learning, which learns changes between patterns in which the distributions of the amounts of infrared energy reflected from the pupil and the remaining part other than the pupil appear in various forms, rather than using normal images reflected from the pupil.

Here, when a neural network is trained, infrared light having a designated pattern is projected on a reflector having a predetermined shape (e.g., an eye, composed of the eyeball and the pupil). Here, a distribution pattern of the amount of energy of infrared light transferred after the infrared light has been reflected from the reflector and has passed through a pinhole mask having a predetermined shape, data about the motion of the reflector at that time, for example, the rotational angle of the eyeball, the location of the pupil, etc., may be used as training data. Then, a change in the distribution pattern depending on the 2.5 dimensional (2.5D) movement of the pupil depending on the rotation of the eyeball may be trained based on deep learning. In this way, a real-time eye-tracking function corresponding to fast eye movement may be provided.

Here, the image generation unit 220 may generate super-proximity multi-view unit images based on the user's eye tracked by the eye-tracking unit 230.

Meanwhile, the eye sensor unit 130 may be integrated with the slim visualization module 100. Therefore, various embodiments of the slim visualization module 100 including the eye sensor unit 130 will be described later with reference to FIGS. 16 to 20.

In accordance with embodiments, the eye sensor unit 130 and the eye-tracking unit 230 may be implemented as a separate eye-tracking device (not illustrated).

Figure 10:
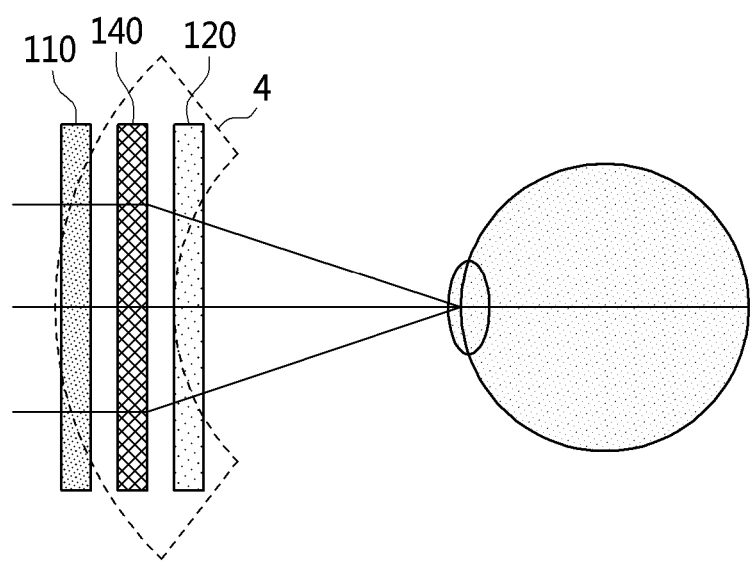
FIG. 10 is a view illustrating an example of the arrangement of a refractive lens according to an embodiment.
Figure 11:
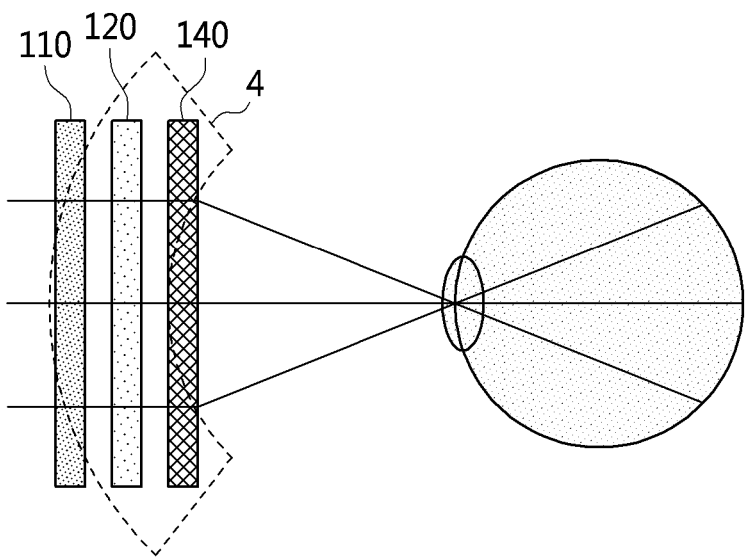
FIG. 11 is a view illustrating an example of the arrangement of a refractive lens according to another embodiment.
Figure 12:
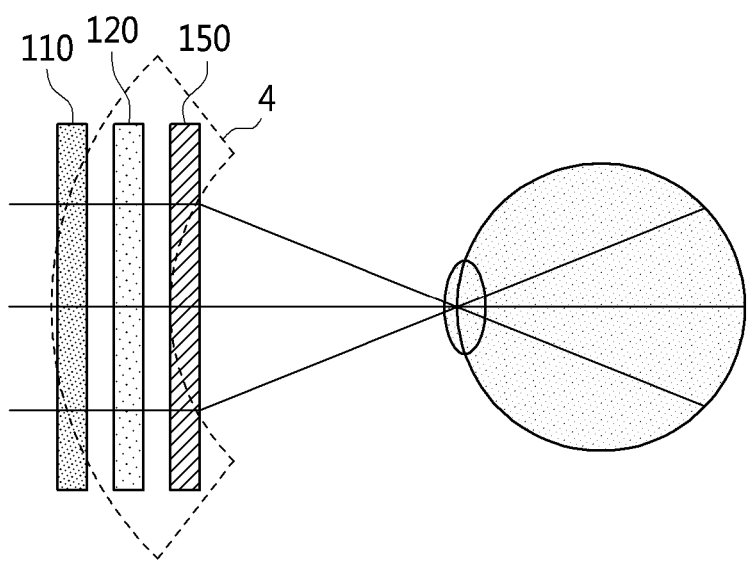
FIG. 12 is a view illustrating the arrangement of a Holographic Optical Element (HOE) according to a further embodiment.

FIG. 10 is a view illustrating an example of the arrangement of a refractive lens according to an embodiment, FIG. 11 is a view illustrating an example of the arrangement of a refractive lens according to another embodiment, and FIG. 12 is a view illustrating the arrangement of a Holographic Optical Element (HOE) according to a further embodiment.

Referring to FIG. 10, a refractive lens 140 may be interposed between a flat panel 110 and a super-proximity visualization optical unit 120 while being spaced apart from the flat panel 110 and the super-proximity visualization optical unit 120.

Here, the refractive lens 140 may allow light to pass through a center portion thereof, and may provide the effect of a convex lens in an edge portion thereof. That is, as illustrated in FIG. 10, the same effect as that of visible light traveling straight from a virtual curved surface 4 may be obtained using the refractive lens 140.

For this operation, the refractive lens 140 may be formed of an optical material, that is, a meta-material for controlling a light travel speed, which allows light to rapidly pass through the edge portion thereof and to slowly pass through the center portion thereof, so as to control the speed of the optical path.

For example, the refractive lens 140 may be implemented as a Fresnel lens or a micro-lens array, having a thickness of several mm.

Here, the super-proximity visualization optical unit 120 may be a pinhole mask in which multiple pinholes are formed at irregular intervals so that the pinholes correspond to the path of visible light refracted by the refractive lens. That is, since the visible light is refracted and then concentrated on the center of the pinhole mask, the pinholes are densely arranged at the center, and separation distances between pinholes at the edge may increase.

Meanwhile, referring to FIG. 11, the refractive lens 140 may be configured such that a first surface thereof is disposed on a second surface of the super-proximity visualization optical unit 120 that faces the display panel 110.

Here, the super-proximity visualization optical unit 120 may be a pinhole mask in which multiple pinholes are formed at regular intervals so that the pinholes correspond to the path of visible light that is traveling straight from the display panel 110.

Referring to FIG. 12, instead of the refractive lens 140, a Holographic Optical Element (HOE) 150 may be used, and thus a refractive index may be increased in the direction moving away from the center of the display panel 110.

Meanwhile, the radius of curvature of the virtual curved surface 4 illustrated in FIGS. 10 to 12 may be determined in consideration of a visual human factor (i.e., visual human characteristic). Here, the human factor may include the retinal curvature and the radius of rotation of the eyeball, and the virtual curved surface may be a curved surface formed by the trajectory of the pupil movement in which the retinal curvature and the radius of rotation of the eyeball are taken into consideration.

Meanwhile, as described above, without the effect of the virtual curved surface 4, the display panel 110 and the super-proximity visualization optical unit 120 may be manufactured to actually have the shape of a curved surface, or alternatively, a curved surface may be elastically formed using a flexible element.

Here, the radius of curvature of the actually formed curved surface may be determined in consideration of a visual human factor. Here, the human factor may be a curved surface formed by the trajectory of the pupil movement in which the retinal curvature and the radius of rotation of the eyeball are taken into consideration.

Figure 13:
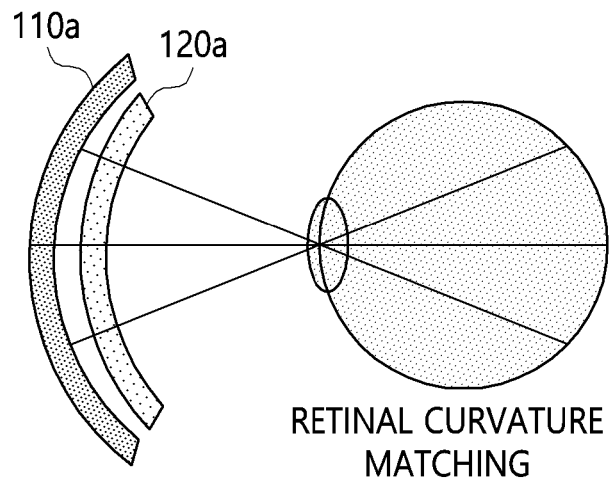
FIGS. 13 and 14 are views illustrating examples of the arrangement of a display panel and a super-proximity visualization optical unit which are formed in the shape of curved surfaces according to an embodiment.
Figure 14:
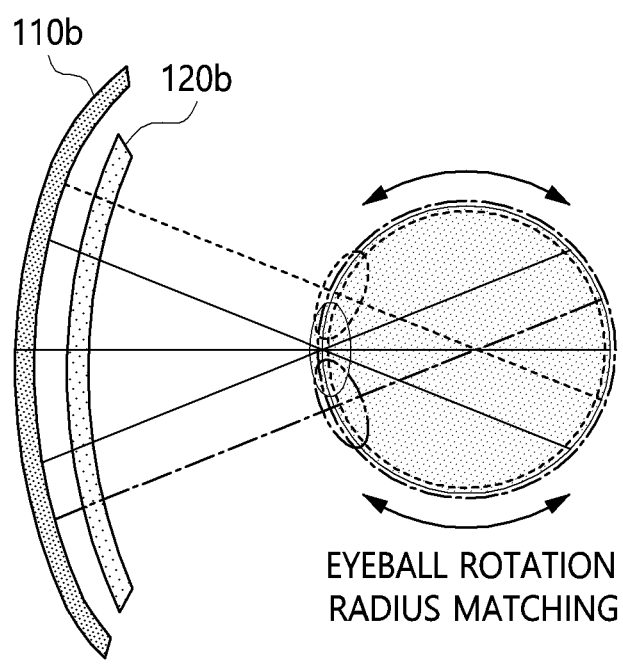

FIGS. 13 and 14 are views illustrating examples of the arrangement of a display panel and a super-proximity visualization optical unit which are formed in the shape of curved surfaces according to an embodiment.

Referring to FIG. 13, a display panel 110a and a super-proximity visualization optical unit 120a may have the shape of curved surfaces matching the retinal curvature, which is a human factor.

Referring to FIG. 14, a display panel 110b and a super-proximity visualization optical unit 120b may have the shape of curved surfaces matching the radius of rotation of the eyeball, which is a human factor. Also, pinholes in the pinhole mask which is the super-proximity visualization optical unit 120a may be processed at equal intervals within the range of rotation.

Figure 15:
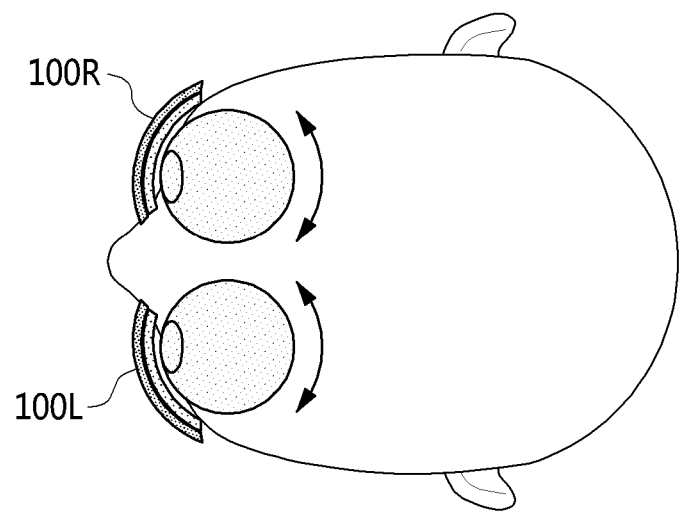
FIG. 15 is a view illustrating an example in which a slim visualization module, formed in the shape of a curved surface, according to an embodiment is worn.

FIG. 15 is a view illustrating an example in which a slim visualization module, formed in the shape of a curved surface, according to an embodiment is worn.

Referring to FIG. 15, it is illustrated that a user wears slim visualization modules 100R and 100L, each composed of the display panel 110a or 110b and the super-proximity visualization optical unit 120a or 120b, which are actually formed in the shape of curved surfaces, as illustrated in FIGS. 13 and 14, thus improving the closeness of contact.

Meanwhile, the eye sensor unit 130 may be integrated into the slim visualization module 100 so as to be included in the slim visualization module 100. In this case, in accordance with various embodiments of FIGS. 10 to 15, the slim visualization module 100 including the eye sensor unit 130 may also be implemented in various embodiments.

FIGS. 16 to 20 are views illustrating various embodiments of a slim visualization module including an eye sensor unit.

Figure 16:
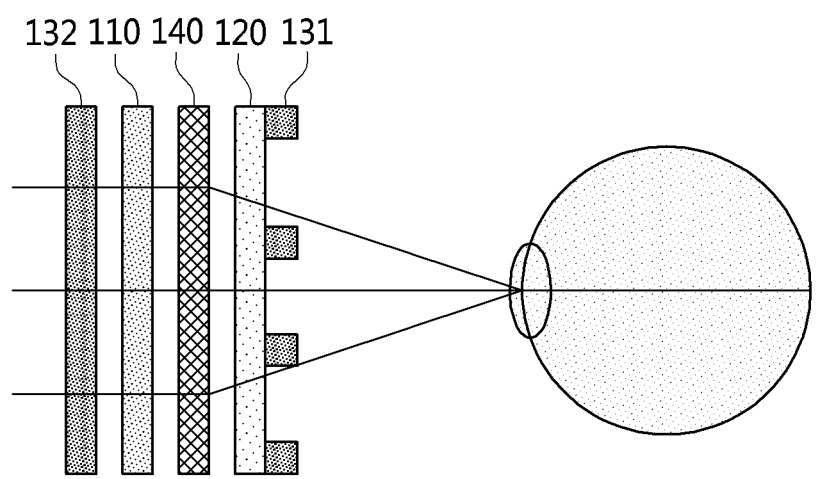
FIGS. 16 to 20 are views illustrating various embodiments of a slim visualization module including an eye-tracking unit.

Referring to FIG. 16, when a refractive lens 140 is interposed between a flat panel 110 and a super-proximity visualization optical unit 120 while being spaced apart therefrom, infrared light sources 131 may be attached to a region between pinholes in the surface of the super-proximity visualization optical unit 120.

Figure 17:
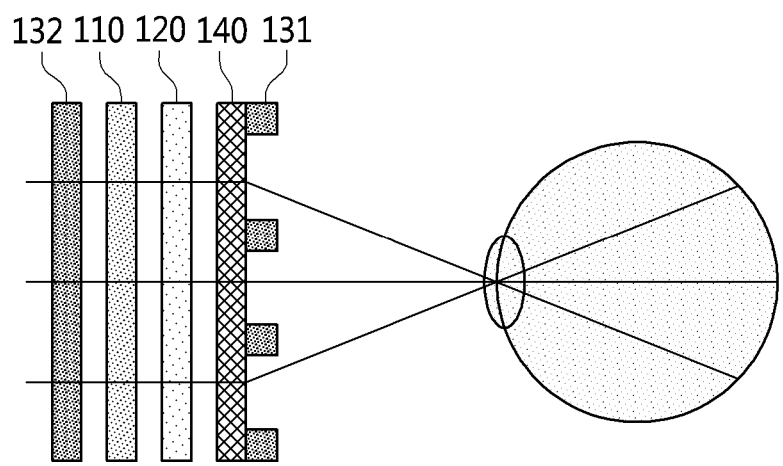

Referring to FIG. 17, when a first surface of the refractive lens 140 is disposed on a second surface of the super-proximity visualization optical unit 120, which faces the display panel 110, the infrared light sources 131 may be attached to the surface of the refractive lens 140. Here, the infrared light sources 131 must be formed at locations that do not hide the visible light that is projected while passing through the pinholes in the super-proximity visualization optical unit 120.

Figure 18:
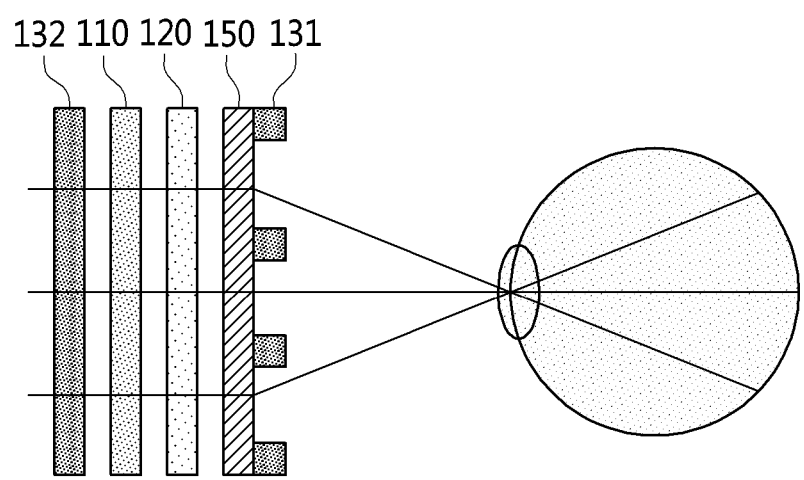

Referring to FIG. 18, when the Holographic Optical Element (HOE) 150 is applied instead of the refractive lens 140, the infrared light sources 131 may be attached to the surface of the HOE 150. Here, the infrared light sources 131 must be formed at locations that do not hide the visible light that is projected while passing through the pinholes in the super-proximity visualization optical unit 120.

Figure 19:
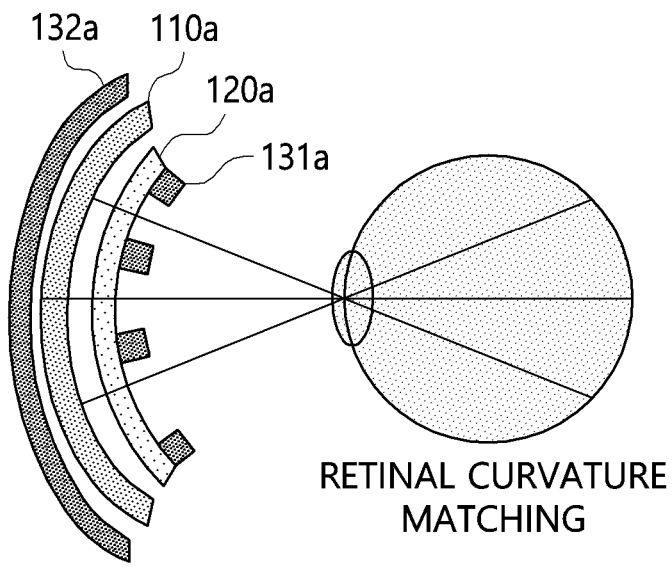

Referring to FIG. 19, when a display panel 110a and a super-proximity visualization optical unit 120a have the shape of curved surfaces matching a retina curvature, infrared light sources 131a may be attached to a region between pinholes in the surface of the super-proximity visualization optical unit 120a having the shape of a curved surface, and an infrared light reception unit 132a may be manufactured in the shape of a curved surface matching the retina curvature.

Figure 20:
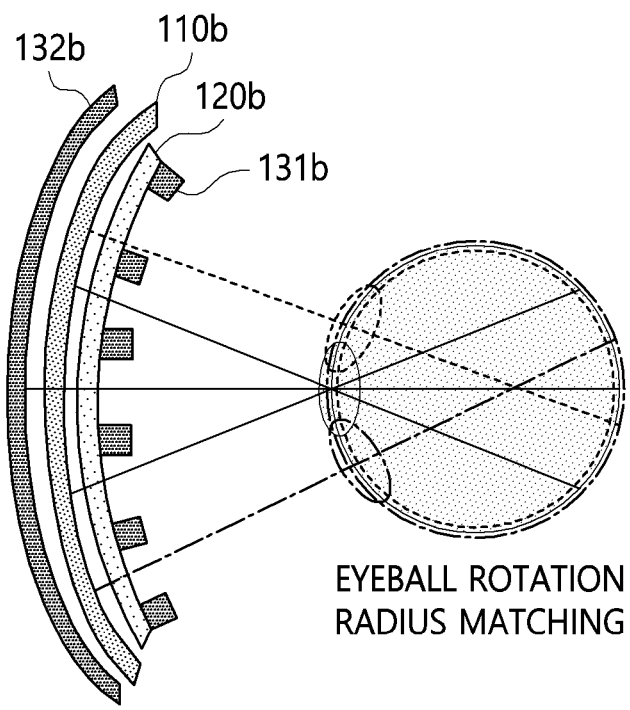

Referring to FIG. 20, when a display panel 110b and a super-proximity visualization optical unit 120b have the shape of curved surfaces matching the radius of rotation of the eyeball, infrared light sources 131b may be attached to a region between pinholes in the surface of the super-proximity visualization optical unit 120b having the shape of a curve surface, and an infrared light reception unit 132b may be manufactured in the shape of a curved surface matching the radius of rotation of the eyeball.

Figure 21:
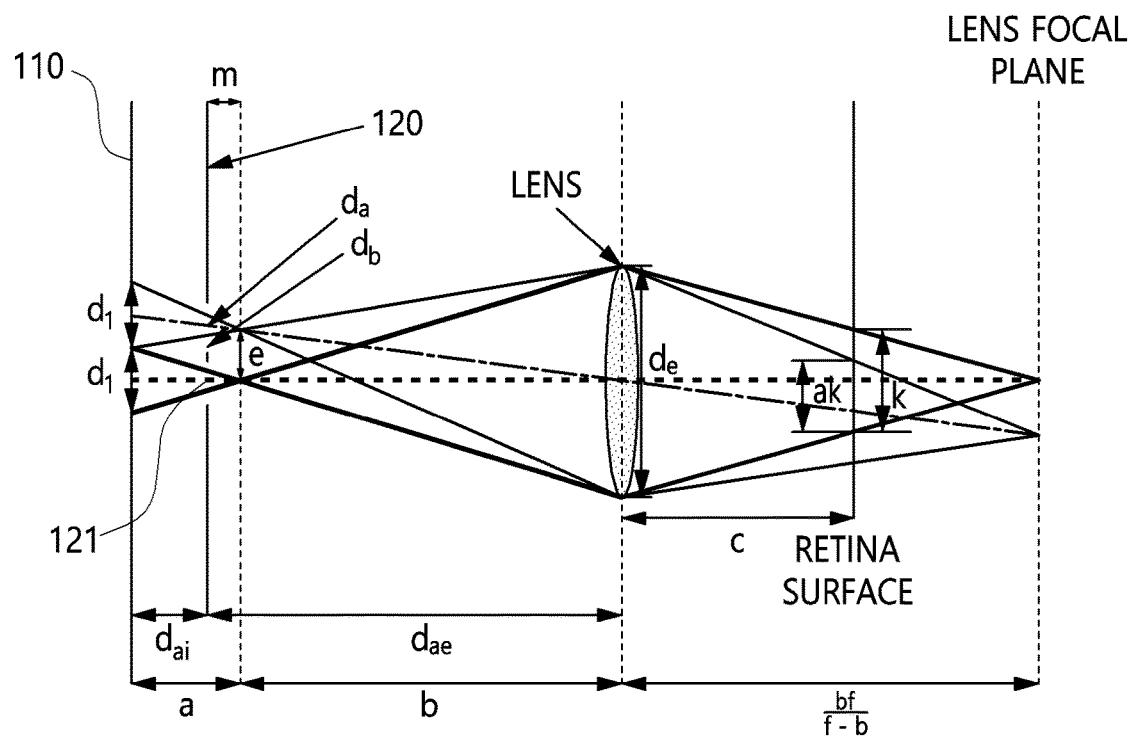
FIG. 21 is a diagram for explaining the generation of a multi-view image by an image generation unit according to an embodiment.
Figure 22:
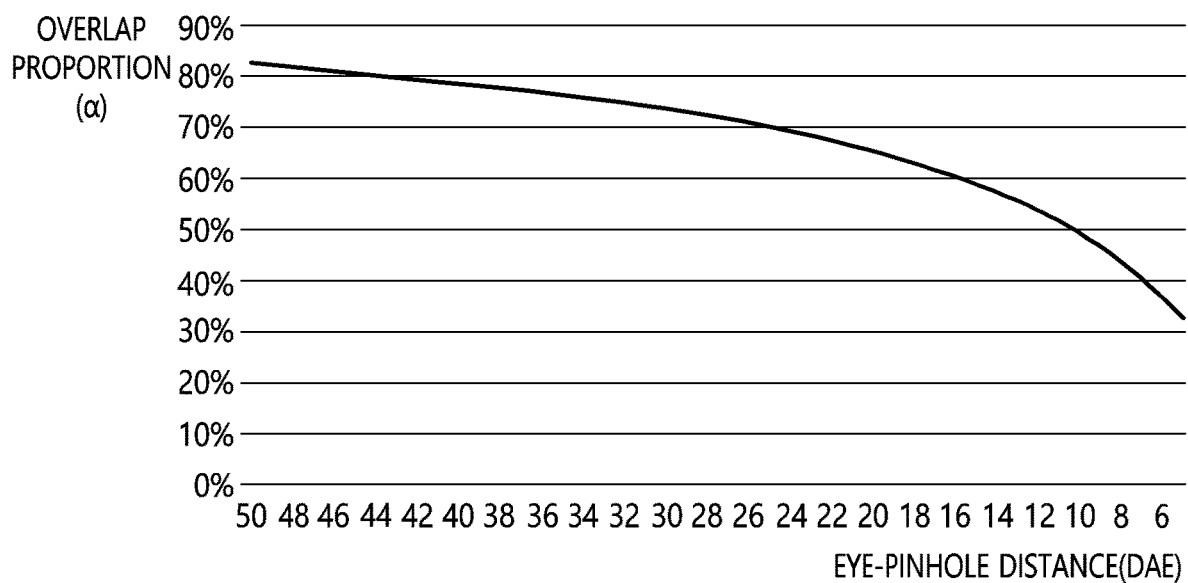
FIGS. 22 to 24 are graphs showing the simulation of correlations between multi-view image generation condition variables.
Figure 23:
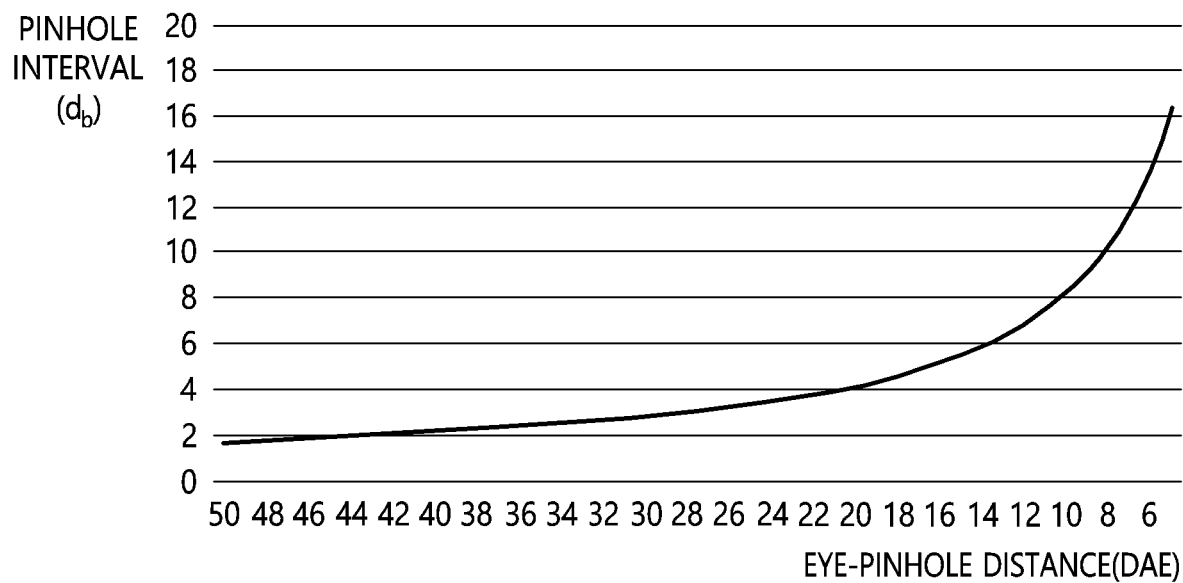
Figure 24:
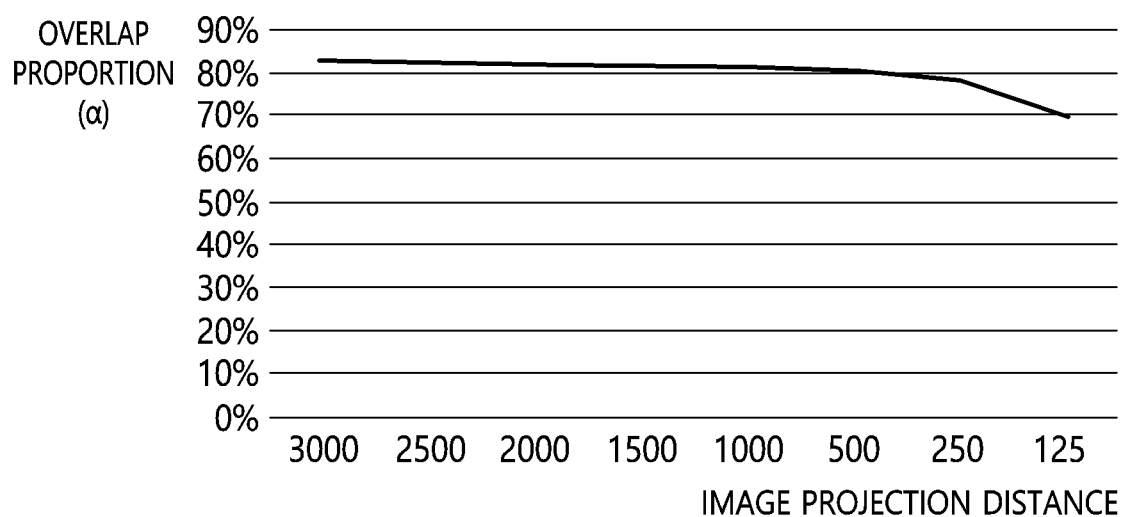

FIG. 21 is a diagram for explaining the generation of a multi-view image by an image generation unit according to an embodiment, and FIGS. 22 to 24 are graphs showing the simulation of correlations between multi-view image generation condition variables; and Referring to FIG. 21, when visible light corresponding to a multi-view unit image $d_1$ output via a display panel 110 passes through pinholes 121 in a pinhole mask 120 and reaches the lens of the eye, the lens may form the unit image $d_1$ on the surface of the retina.

Here, the separation distance between the display panel 110 and the pinhole mask 120 is $d_{ai}$, the diameter of each pinhole is $d_a$, the interval between pinholes is $d_b$, the separation distance between the pinhole mask 120 and the lens is $d_{ae}$, the diameter of the lens is $d_e$, the separation distance between the lens and the retina surface is c, the focal length (distance) is f, and the size of an image formed on the retina surface with respect to the unit image $d_1$ is k.

Here, the image generation unit 220 may calculate the size of the multi-view unit image $d_1$ using the following Equation (1):

$$d_1 = \frac{d_e(m + d_{ai})}{(d_{ae} - m)}, \text{ where } m = \frac{d_a d_{ae}}{(d_a + d_e)} \tag{1}$$

Here, the variables used to calculate $d_1$ in Equation (1) may be set within ranges satisfying the following two conditions.

First, the first condition is that, in accordance with the embodiments, the slim visualization module 100 must be designed to be as thin as possible, and thus the distance (a+b) from the display panel 110 to the lens must be minimized.

Next, the second condition is that, in order to form a high-quality image on the retina, the size αk of overlaps between unit images formed on the retina must be minimized such that each of image pixels of the image output to the display panel 110 can form a single image on the retina. In other words, the overlap proportion a must be minimized.

Here, the overlap proportion a may be derived from the relationships between the basic formula of the lens (thin lens formula) and proportions, as represented by the following Equation (2):

$$\alpha(\text{overlap proportion}) = 1 - \frac{cd_1 d_{ae} f}{(d_{ai} + d_{ae})\{(f-c)d_e d_{ae} + (d_a + d_e)cf\}} \quad (2)$$

Graphs showing the simulation of correlations between the variables in Equation (2) are illustrated in FIGS. 22 to 24.

Detailed constants for the variables included in Equations (1) and (2) may be determined in consideration of the two foregoing conditions, the correlations between the variables, etc., during the procedure for optimizing the parts of the display panel 110 used to implement the proposed technology, the thickness of the pinhole mask 120 manufactured according to arbitrary values, the size of the pinholes 121, the intervals between the pinholes, and the design values for a support frame for bringing the slim visualization module 100 into close contact with a facial part.

Meanwhile, at least one of the environment information control unit 210, the image generation unit 220, and the eye-tracking unit 230 illustrated in FIG. 3 may be integrated into the slim immersive display device 10, or may be implemented as a separate computer system that is capable of communicating with the slim visualization module (device) 100 through wired/wireless communication.

Figure 25:
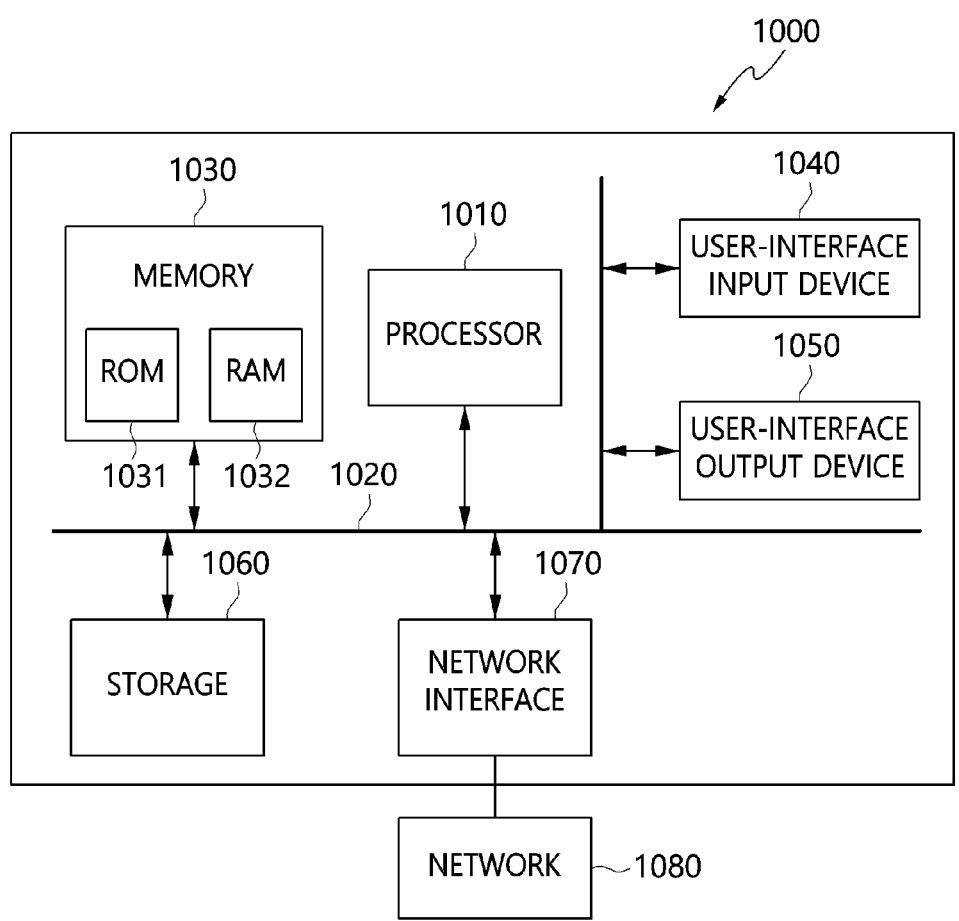
FIG. 25 is a block diagram illustrating the configuration of a computer system according to an embodiment.

FIG. 25 is a diagram illustrating the configuration of a computer system according to an embodiment.

At least one of the environment information control unit 210, the image generation unit 220, and the eye-tracking unit 230 according to the embodiments may be implemented in a computer system 1000, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium or an information delivery medium. For example, the memory 1030 may include Read-Only Memory (ROM) 1031 or Random Access Memory (RAM) 1032.

In accordance with the embodiments, the manufacture of an HMD having a wearing structure enabling close contact with the eyes is possible, and thus there is an advantage in that the field of view, which is defined by the relationships between the eyes, the size of a display, and the distance between the eyes and the display, may be maximized.

Further, in accordance with embodiments, unlike a conventional HMD (e.g., PiMax's 8K HMD) having an excessively large volume and weight to obtain a wide field of view, an HMD having a slim structure and a lightweight structure may be realized, thus preventing the HMD from interfering with the presence of a user's experience in virtual reality.

Furthermore, in accordance with embodiments, by means of an optical system having a wide range of focal length, human engineering characteristics are reflected based on visual sensory organs, and a virtual training system enabling the best image quality can be provided to a user.

Furthermore, since a pinhole camera model-based optical system is used, images at long distances approximating infinity may be clearly formed on the retina from a very short distance of several cm or less, and thus there is an advantage in that an individual module for separate eyesight correction, required by the current commercial HMD, is not needed.

Although the embodiments of the present invention have been disclosed, those skilled in the art will appreciate that the present invention can be implemented in other concrete forms, without departing from the technical spirit or essential features of the invention as disclosed in the accompanying claims. Therefore, it should be understood that the exemplary embodiment is only for illustrative purpose and do not limit the bounds of the present invention.

What is claimed is:

1. A slim immersive display device comprising:
a display panel;
a super-proximity visualization optical unit formed of a pinhole array film or a micro-lens array and configured to form an image output via the display panel on a retina of an eyeball of a user located a very short distance from the super-proximity visualization optical unit;
an environment information control unit configured to determine an image to be output in accordance with virtual reality environment information;
an image generation unit configured to generate the output image determined by the environment information control unit in a form of super-proximity unit images and output the super-proximity unit images to the display panel; and
an eye sensor unit configured to sense movement of a pupil of the eyeball of the user and include at least one infrared light source configured to project infrared light onto the eyeball of the user,
wherein the super-proximity visualization optical unit is a pinhole mask manufactured using the pinhole array film, wherein multiple pinholes are formed in the pinhole mask,
wherein the at least one infrared light source is configured such that multiple infrared light sources are disposed in a region in the pinhole mask where the multiple pinholes are not formed.

2. The slim immersive display device of claim 1, further comprising:
an eye-tracking unit configured to track the user's eye based on information about the sensed movement of the pupil,
wherein the image generation unit generates super-proximity multi-view unit images based on the tracked user's eye.

3. The slim immersive display device of claim 2, wherein:
the display panel, the super-proximity visualization optical unit, and the eye sensor unit are implemented as an integrated slim visualization module, and
the slim visualization module is divided to correspond to a left eye and a right eye.

4. The slim immersive display device of claim 3, further comprising a refractive lens configured to refract visible light that is traveling straight in accordance with the image output via the display panel in a direction of a center of the eyeball of the user.

5. The slim immersive display device of claim 4, wherein the refractive lens is a Fresnel lens or a micro-lens array.

6. The slim immersive display device of claim 4, wherein:
the refractive lens is interposed between the display panel and the super-proximity visualization optical unit, and
the super-proximity visualization optical unit is a pinhole mask in which the multiple pinholes are formed at irregular intervals so that the pinholes correspond to a path of visible light refracted by the refractive lens.

7. The slim immersive display device of claim 4, wherein:
the refractive lens is configured such that a first surface thereof is disposed on a second surface of the super-proximity visualization optical unit facing the display panel, and
the super-proximity visualization optical unit is a pinhole mask in which the multiple pinholes are formed at regular intervals so that the pinholes correspond to a path of visible light that is traveling straight from the display panel.

8. The slim immersive display device of claim 3, further comprising a holographic optical element configured to refract visible light that is traveling straight in accordance with the image output via the display panel in a direction of a center of the eyeball of the user.

9. The slim immersive display device of claim 3, wherein the slim visualization module has a shape of a curved surface.

10. The slim immersive display device of claim 3, wherein the eye sensor unit further comprises:
an infrared light reception unit configured to receive infrared light reflected from the eyeball of the user, and
the eye-tracking unit tracks movement of a pupil depending on a distribution pattern of an amount of energy of infrared light received by the infrared light reception unit.

11. The slim immersive display device of claim 10, wherein the eye-tracking unit is implemented as a neural network that is previously trained with distribution patterns of amounts of energy of infrared light reflected from the pupil of the eyeball of the user and from a remaining part other than the pupil.

12. The slim immersive display device of claim 1, wherein the image generation unit generates super-proximity unit images so that proportions of overlaps between two or more super-proximity unit images formed on a retina of the eyeball of the user are minimized while minimizing a distance from the display panel to a lens of the eye of the user.

13. The slim visualization device of claim 12, further comprising:
an infrared light reception unit configured to receive infrared light reflected from the eyeball of the user, and then acquire energy information of the infrared light.

14. A slim visualization device comprising:
a display panel configured to output an image signal that is externally input;
a super-proximity visualization optical unit formed of a pinhole array film or a micro-lens array and configured to form an image output via the display panel on a retina of an eyeball of a user located a very short distance from the super-proximity visualization optical unit; and
an eye sensor unit configured to sense movement of a pupil of the eyeball of the user and include at least one infrared light source configured to project infrared light onto the eyeball of the user,
wherein the super-proximity visualization optical unit is a pinhole mask manufactured using the pinhole array film, wherein multiple pinholes are formed in the pinhole mask,
wherein the at least one infrared light source is configured such that multiple infrared light sources are disposed in a region in the pinhole mask where the multiple pinholes are not formed.

15. The slim visualization device of claim 14, further comprising a refraction unit configured to refract visible light that is traveling straight in accordance with the image output via the display panel in a direction of a center of the eyeball of the user,
wherein the refraction unit is one of a Fresnel lens, a micro-lens array, and a holographic optical element.

16. The slim visualization device of claim 15, wherein:
the refraction unit is interposed between the display panel and the super-proximity visualization optical unit, and
the super-proximity visualization optical unit is a pinhole mask in which the multiple pinholes are formed at irregular intervals so that the pinholes correspond to a path of visible light refracted by the refraction unit.

17. The slim visualization device of claim 15, wherein:
the refraction unit is configured such that a first surface thereof is disposed on a second surface of the super-proximity visualization optical unit facing the display panel, and
the super-proximity visualization optical unit is a pinhole mask in which the multiple pinholes are formed at regular intervals so that the pinholes correspond to a path of visible light that is traveling straight from the display panel.

18. A user eye-tracking device comprising:
an infrared light source configured to project infrared light onto an eyeball of a user;
an infrared light reception unit configured to receive infrared light reflected from the eyeball of the user; and
an eye-tracking unit configured to track movement of a pupil depending on a distribution pattern of an amount of energy of infrared light received by the infrared light reception unit,
wherein the eye-tracking unit is implemented as a neural network that is previously trained with distribution patterns of amounts of energy of infrared light reflected from the pupil of the eyeball of the user and from a remaining part other than the pupil,
wherein the infrared light source is configured such that multiple infrared light sources are disposed in a region in a pinhole mask where multiple pinholes are not formed.

* * * * *